United States Patent [19]
Herrell et al.

[11] Patent Number: 5,416,893
[45] Date of Patent: May 16, 1995

[54] METHOD FOR DISPLAYING EDGING OR DECALING OF AN OBJECT IN A GRAPHICS DISPLAY

[75] Inventors: Russ Herrell; Joe Baldwin; Christopher G. Wilcox, all of Ft. Collins, Colo.

[73] Assignee: Hewlett-Packard Co., Palo Alto, Calif.

[21] Appl. No.: 143,686

[22] Filed: Oct. 26, 1993

[51] Int. Cl.⁶ .................................................. G06T 15/10
[52] U.S. Cl. ..................................... 395/122; 395/119; 395/121; 395/135
[58] Field of Search ............... 395/119, 120, 121, 122, 395/124, 127, 133, 135

[56] References Cited

U.S. PATENT DOCUMENTS

| | | | |
|---|---|---|---|
| 4,808,988 | 2/1989 | Burke et al. | 395/143 |
| 5,123,085 | 6/1992 | Wells et al. | 395/121 |

OTHER PUBLICATIONS

Akeley, Kurt, "The Hidden Charms of Z-Buffer", IRIS Universe, Issue No. 11.

*Primary Examiner*—Almis Jankus

[57] ABSTRACT

A system for implementing polygon edging of objects in a graphics display. In a first pass, the system renders the polygon fill with z-buffer comparison and replace enabled, however, for each pixel written to the display frame buffer and z-buffer, an edging plane bit for the pixel is set. A second pass renders the polygon edges with z-buffer comparison and z-buffer replace enabled and uses the edging plane bit as a virgin bit. A third pass re-renders the polygon fill, but only resets the edging plane bit for each pixel. The system may also use a virgin bit available in the z-buffer as the edging plane bit.

10 Claims, 7 Drawing Sheets

METHOD FOR DISPLAYING EDGING OR DECALING OF AN OBJECT IN A GRAPHICS DISPLAY

FIELD OF THE INVENTION

This invention relates to computer systems, and more particularly to graphics display of objects within computer systems. Even more particularly, the invention relates to a method for displaying edges of objects displayed on a graphics display.

BACKGROUND OF THE INVENTION

With computer work stations providing ever more sophisticated graphics, many applications are progressing from rendering wire frame images of objects to rendering shaded images of the surfaces of the objects. While smooth shading provides increased realism and the ability to visualize more complex models, some of the advantages of the wire frame representation may be lost. To benefit from the best of both methods, work station applications often combine wire frame and shaded primitives in the same image, by displaying the shaded surface followed by displaying the edges of the shaded surface to represent the wire frame.

A wire frame can overlay a shaded surface to provide structural information, such as the original data points that generated the model. When a model is constructed using splines, the wire frame can show spline patch boundaries, or the control points used to calculate the spline surface. Another benefit of wire frame modeling is selective highlighting of a subset of the model, such as a subassembly within a complex mechanical part. This information provides insight which can be invaluable to designers.

Applications use a variety of methods to simultaneously display wire frame and shaded objects. Some graphics libraries provide polygon edging support directly, which means a polygon can be rendered with a solid fill and edged in a distinct color with a single call to the library. If no such support exists, the application must display a filled polygon followed by vectors which make up the polygon edge. Some applications prefer to display edge vectors after rendering all polygons, to progressively highlight different features of the model. To correctly combine object primitives with their edges, hidden surface removal must be enabled.

Hidden surface removal is often implemented through a mechanism called a z-buffer. The pixels on a graphics screen are referenced using x and y locations, in the same manner points on a graph are referenced. This is effective, since a graphics screen is two dimensional, so only x and y dimensions are needed. For hidden surface removal, however, the depth of each object being displayed, with respect to the position of the viewer, is needed. Since the depth dimension in a three dimensional coordinate system is typically called the z-dimension, the depth information for hidden surface removal is kept in an area called a z-buffer, which may be located in computer memory or within the graphics display device. The z-buffer contains the depth of each pixel relative to the surface of the screen, and therefore away from the position of the viewer. Thus, when a pixel is to be displayed, its depth location is compared to the depth of the pixel already being displayed on the screen, and if the new pixel is closer to the viewer's position, the new pixel replaces the pixel currently being displayed on the screen. If, however, the new pixel is further away, it is discarded since it would be located behind the pixel currently being displayed.

When converting an object from internal representation to a displayable format, called scan conversion, artifacts can be produced during the combined rendering of a polygonal surface and associated edge vectors. Because the z-buffer values, computed during the scan conversion process, for the surface and the edge vectors may differ slightly, interference between the surface and edge can occur. When edge pixels are overwritten by the surface fill, the resulting polygon edge will have missing pixels. This problem is referred to as edge stitching, since the result looks like sewing stitches. A similar problem occurs when highlighting vectors are sent after the polygonal model is complete. If the edging method leaves interfering values from the polygon fill in the z-buffer, then highlighting vectors will again conflict to produce edge stitching.

The reason the scan conversion process produces these inaccuracies is that scan conversion is really a process of sampling, with all of the associated numerical inaccuracies. If the calculation of z-buffer values is not exactly identical for vectors and polygons, then polygon edging will exhibit artifacts.

One solution to the z-buffer intersection problem is to "pull" the polygon edge z-buffer values forward towards the viewer by arbitrarily changing the z-buffer values for the edges. While this technique can be made to work for simple models, it has serious drawbacks as a general solution. One difficulty with this approach is determining the amount of z-buffer adjustment. If too much correction is applied, polygon edges will poke out into other objects in the scene. If not enough adjustment is made, polygon edges will still exhibit missing pixels. When the magnitude of the adjustment is computed based on the entire z-buffer range, objects which use only a small part of the z-buffer range may be adjusted too much. However, computing the z-buffer adjustment on a per primitive basis adds unacceptable overhead to the polygon edging method.

One prior art method that solves a similar problem is disclosed in "The Hidden Charms of Z-Buffer", Kurt Akeley, in *Iris Universe*, Volume 11, pages 31–37 (spring 1990). This method is for drawing a decal on a surface, not for drawing edges, however, the process is similar. A decal is a graphic that is placed on the surface of another graphic, such as by painting a symbol on a surface, and thus the two graphics are nearly co-planar. The Akeley decaling method requires three passes and is based on drawing the decal before replacing the z-buffer values for the polygon fill, which prevents the polygon fill from interfering with the decal. The method first renders the polygon fill to the frame buffer while performing z-buffer compares, but without storing new z-buffer values. The second pass renders the decal to the frame buffer while also performing z-buffer compares, but without updating the z-buffer. In the third pass, the method re-renders the polygon fill while performing z-buffer compares, only for the purpose of locating the fill pixels. After locating each fill pixel, the method updates the z-buffer values of each fill pixel without changing the frame buffer. In this method, z-buffer comparisons between the two primitives are avoided since the z-buffer is not updated until after the decal is drawn. This method leaves only the values for the fill pixels in the z-buffer, which is a drawback, since primitives rendered later on top of the decal may still miss pixels. That is, the method works fine initially, but if the decal is redrawn, for example, in a different color, stitching may result since the z-buffer values may be incorrect at the decal locations.

This method also is limited when a portion of the decal extends outside the edge of the polygon. In this instance, the method will render the graphic incorrectly, since the method will not update the z-buffer values for those portions of the decal that are located outside the boundaries of the polygon.

This also limits the method for edging, since some pixels of edges are often located just outside the boundaries of the polygon, as will be shown below with respect to FIG. 2. Even for those edge pixels that lie within the fill boundary, however, some z-buffer values may be incorrect in the Akeley method, as also will be shown below with respect to FIG. 2.

Another prior art method used by the Hewlett Packard Company, called decal edging, adapts the Akeley method by updating the z-buffer during the second pass. Although this method is more likely than the Akeley method to leave correct values in the z-buffer, the method may leave incorrect values in the z-buffer after the third pass. This is because the z-buffer value for fill pixels, updated during the third pass, may replace the z-buffer value for edge pixels, which were updated in the second pass, depending upon how the two z-buffer values compare. Thus, the edge pixels that fall within the fill boundary may have fill pixel z-buffer values after the third pass, which can result in stitching.

There is need in the art, then, for a method for rendering objects and rendering the edges of the objects in a manner that prevents stitching within the edges. A further need in the art is for such a method that renders the edges while leaving the z-buffer values correct for the edges, such that the edges can be rendered subsequent times without leaving artifacts.

SUMMARY OF THE INVENTION

It is an aspect of the present invention to display edges of objects, such as polygons, on a graphics display.

It is another aspect of the invention to display such edges without discontinuities.

Another aspect is to display such edges while retaining correct distance information within a z-buffer of the graphics display system.

Still another aspect of the invention is to provide correct z-buffer distance information to allow the polygon edges to be rendered again without leaving artifacts.

A further aspect of the invention is to display decals on top of other objects while providing correct z-buffer distance information to allow the decal to be rendered again without leaving artifacts.

The above and other aspects of the invention are accomplished in a system that uses either software or a combination of software and electronics to implement polygon edging and decaling. In a first pass, the system renders the polygon fill with z-buffer comparison and replace enabled, and in addition, for each pixel written to a frame buffer and z-buffer, an edging plane bit for the pixel is set to one. A second pass renders the polygon edges or decal with z-buffer comparison and z-buffer replace enabled and, in addition, it always replaces pixels having their edging plane bit set to one. A third pass re-renders the polygon fill, but only clears the edging plane bit for each fill pixel. At the end of the three passes, the z-buffer and frame buffer are correct for each of the pixels, and the z-buffer values for the edge or decal pixels are correct to allow re-rendering of the edges or decal without causing artifacts.

In one embodiment of the invention, the edging plane bits are stored as an array in the memory of the computer system containing the graphics display software. In a second embodiment, the edging plane bits share a virgin bit contained in a z-buffer within the hardware of the display device.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
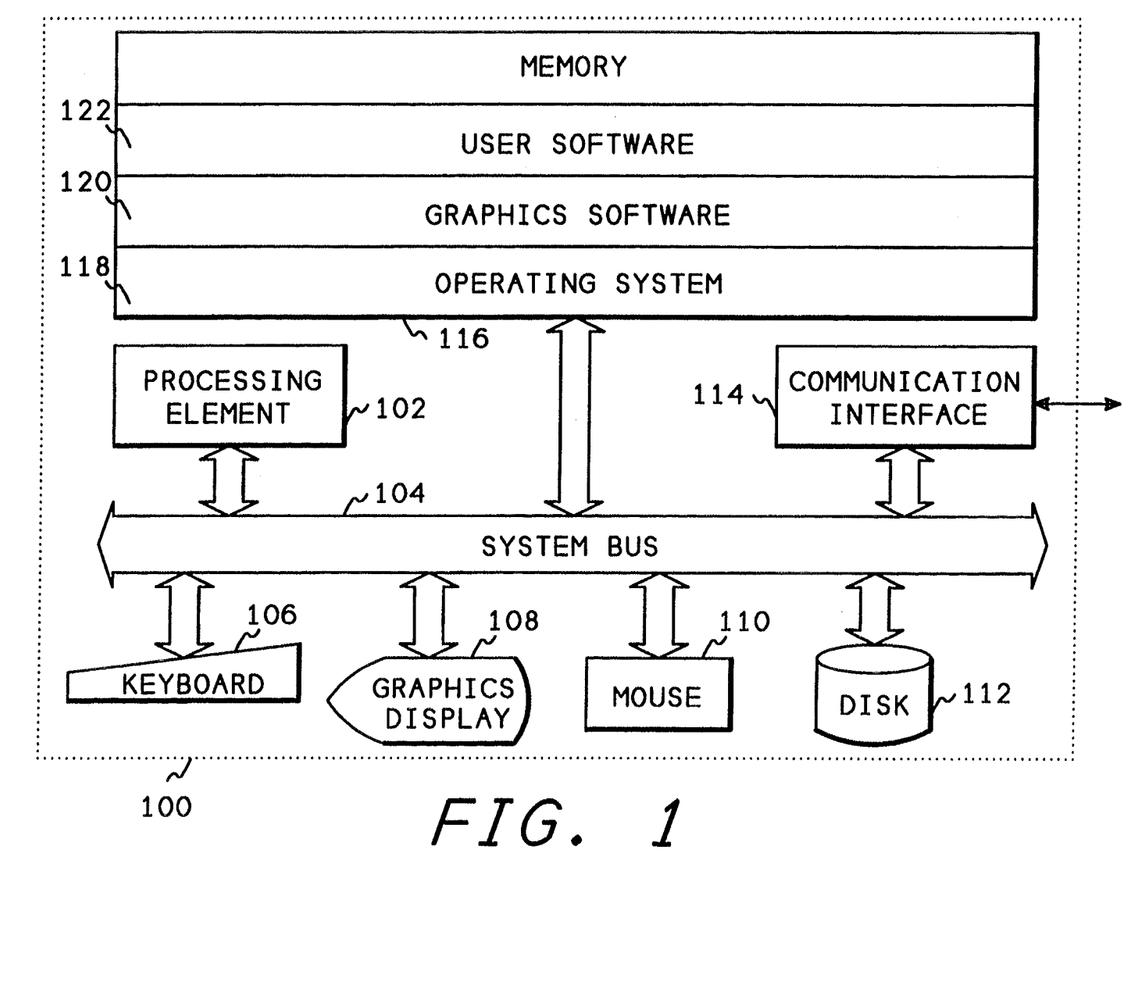
FIG. 1 shows a block diagram of a computer system incorporating the present invention.

FIG. 1 shows a block diagram of a computer system incorporating the present invention. Referring now to FIG. 1, a computer system 100 contains a processing element 102. The processing element 102 communicates to other elements of the computer system 100 over a system bus 104. A keyboard 106 allows text input to the computer system 100 and a mouse device 110 allows locator input to the computer system 100. A graphics display 108 provides output from the computer system 100, and includes the control logic and z-buffer mechanisms described below with respect to FIG. 7. A disk 112 serves as mass storage for the computing system, and communications interface 114 allows the computer system 100 to communicate to other computer systems.

A memory 116 contains an operating system 118, such as the Unix operating system, and contains the graphics software 120 of the present invention along with user software 122 which calls the graphics software 120.

Figure 2:
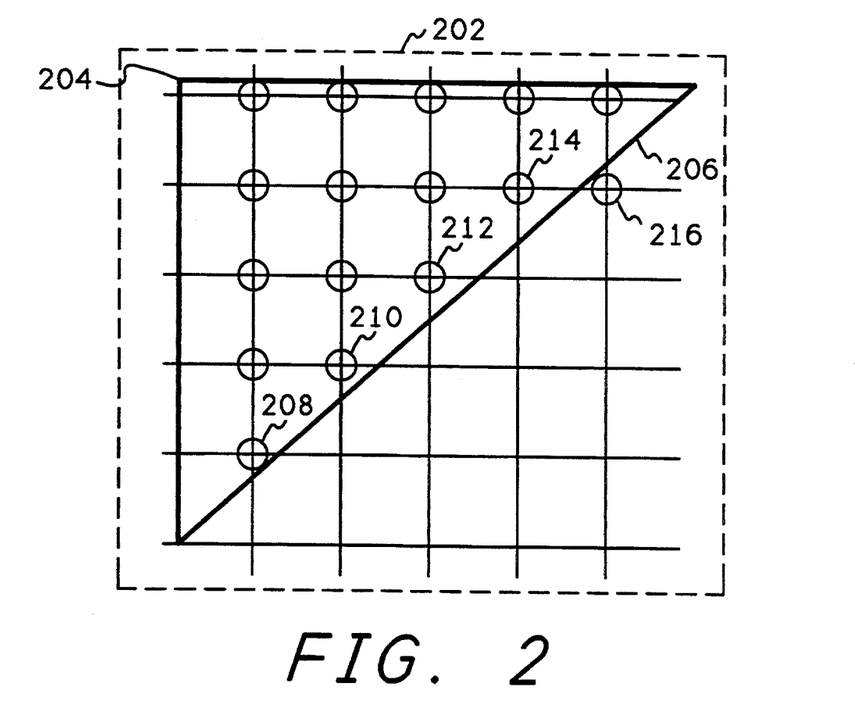
FIG. 2 shows a graphics display of an object, and illustrates how edge stitching can occur.

FIG. 2 shows a graphics display of a polygon, and illustrates where edge stitching may occur. Referring now to FIG. 2, a graphics screen 202, which would typically be displayed on the graphics display 108 (FIG. 1), contains a polygon 204, which in this case is a triangle. One edge 206 of the polygon 204 runs diagonally across the screen, and away from the viewer, thus it imperfectly intersects some of the pixels of the screen, which may cause an edge vector scan conversion method to select pixels outside the polygon fill. For example, pixels 208, 210, 212, 214 and 216 are closest to the edge 206, so they would be selected by an edge vector scan conversion method. Pixel 216, however, is outside the polygon, and would not be selected by a polygon filling scan conversion method.

The typical scan conversion method for a polygon requires that fill pixels remain inside the true boundaries of the polygon. If simple vector methods are used to paint the edges, these methods have no knowledge of the polygon, and hence, will often choose pixels which lie outside the polygon boundary, such as pixel 216.

Because the edge primitive, a vector, or some other primitive, as well as a decal, does not use the same scan conversion method as the polygon fill primitive, the z-values for pixels which are common to both primitives will not always be the same. Thus, the edge or decal may fall slightly behind or in front of the polygon. Low z-buffer math precision (16–32 bits of integer versus 32–64 bits for floating point) only makes the problem more severe. For correct re-rendering at a later time, pixels 208–214 should contain the edge or decal z-value.

In the Akeley method, described above, for rendering the fill and edges of the polygon 206, the first pass, which uses a fill polygon method, would render the pixels inside the polygon 204, including pixels 208, 210, 212 and 214, however pixel 216 would not be rendered in pass 1 because it is outside the polygon. As discussed above, the z-buffer values for the pixels rendered in pass 1 would not be updated.

In pass 2, the Akeley method used an edging method to render the edges of polygon 204, including pixels 208, 210, 212, 214, and 216, however, the z-buffer values are not updated. Pixel 216 would be rendered because it is closest to the edge, even though it is not inside the polygon.

In pass 3, the fill polygon method re-renders pixels 208, 210, 212, and 214, which are inside the polygon 204 to update the z-buffer values, however, pass 3 would miss pixel 216, since it is outside the polygon. Although the polygon, and its edges, would be visually correct, pixel 216 has an incorrect z-buffer value, since it was not updated by any of the three passes. Thus, the pixel contains neither the fill z-value nor the edge z-value Therefore, if the edges were re-rendered later, for example to change the color of the edges, pixel 216 might be missed, depending upon its residual z-buffer value. Also, since the pixel is incorrect, a totally bogus result may occur, such as improper hidden surface removal causing something to show through that is actually behind the polygon.

The prior art Hewlett Packard method described above would perform in almost the same manner, except that in pass 2, the z-buffer values for the edge pixels would be updated, if the z-buffer values compared favorably with the residual z-buffer values. Thus, the pixels would have the correct z-buffer value, after pass 2, using this method. Pixels 208, 210, 212, and 214, however, may have their z-buffer values replaced in pass 3, if the polygon fill method calculated their z values to be slightly different from the z values calculated by the edging method, and the difference does not compare favorably. For example, if the polygon fill method indicates that some pixels of polygon fill are in front of the edge with respect to the viewer, those pixels would have their z-values updated in pass 3. If the edge is re-rendered later, these pixels would not be updated, causing stitching. Since two different calculations are performed, one for fill, and one for edging, calculation differences can sometimes cause the z values to be slightly different.

The present invention overcomes these problems by ensuring that the z-buffer value for each pixel is stored by the same scan conversion method that stores the frame buffer value for the pixel. In a first pass, the present invention renders the polygon fill with z-buffer comparison and replace enabled, and in addition, for each pixel displayed, an edging plane bit for the pixel is set to one. A second pass of the invention renders the polygon edges with z-buffer comparison and z-buffer replace enabled and, in addition, it always replaces pixels having their edging plane bit set to one, regardless of the z-buffer comparison. A third pass of the invention re-renders the polygon fill, but only clears the edging plane bit for each fill pixel. At the end of the three passes, the z-buffer and frame buffer are correct for each of the pixels, and the z-buffer values for the edge pixels are correct to allow re-rendering of the edges without causing artifacts.

Applying the method of the present invention to FIG. 2, the first pass renders the pixels inside the polygon 204, including pixels 208, 210, 212, and 214, but not pixel 216, and in addition, an edging bit for each of the pixels is set to one. After this pass all fill pixels have their correct z-buffer values.

Pass 2 of the present invention renders the edge pixels, including pixels 208, 210, 212, 214, and 216, and sets the new z values for pixels 208, 210, 212, and 214 regardless of the z-buffer compare, since their edging plane bits were set by pass 1. Thus pixels 208–214 would receive new z-buffer values, as determined by the edging method, without regard to how the edge z-buffer values compared to the z-buffer values set by the polygon fill method. After this pass, both the fill and edge pixels have correct z-buffer values.

Pass three resets the edging plane bits for all fill pixels, leaving the correct z-buffer values in the pixels. Thus, with the method of the present invention, the edge pixels could be re-rendered at any time, since they have correct z-buffer values.

Figure 2A:
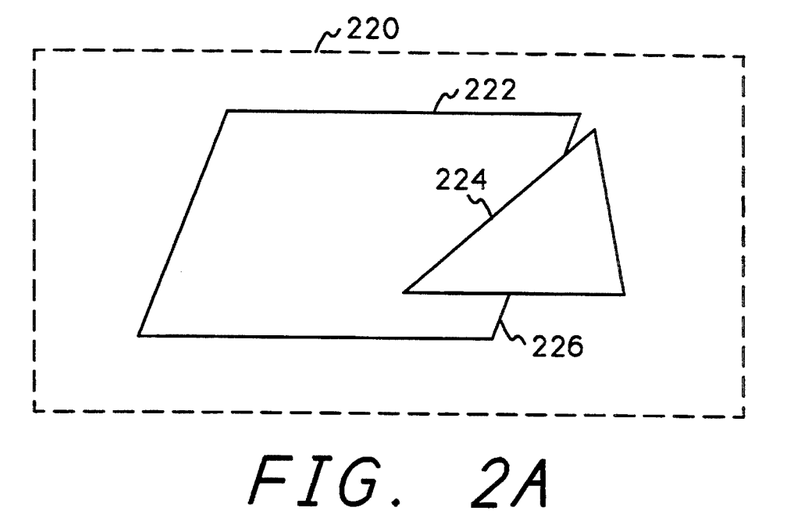
FIG. 2A shows a graphics display of a polygon with a decal object displayed partially on the polygon.

The method of the present invention also works well for the decaling problem described above, and as illustrated in FIG. 2A. Referring now to FIG. 2A, a screen 220 is shown displaying a polygon 222. A decal 224 is shown displayed over the polygon 222, and the decal 224 extends beyond the edge 226 of the polygon 222. Because of the use of the edging plane bit, the present invention will always keep the z-value of the decal instead of the z-value of the polygon fill, when the decal is located over the polygon, even though calculation differences might place the z-value for the decal behind the polygon.

Figure 3:
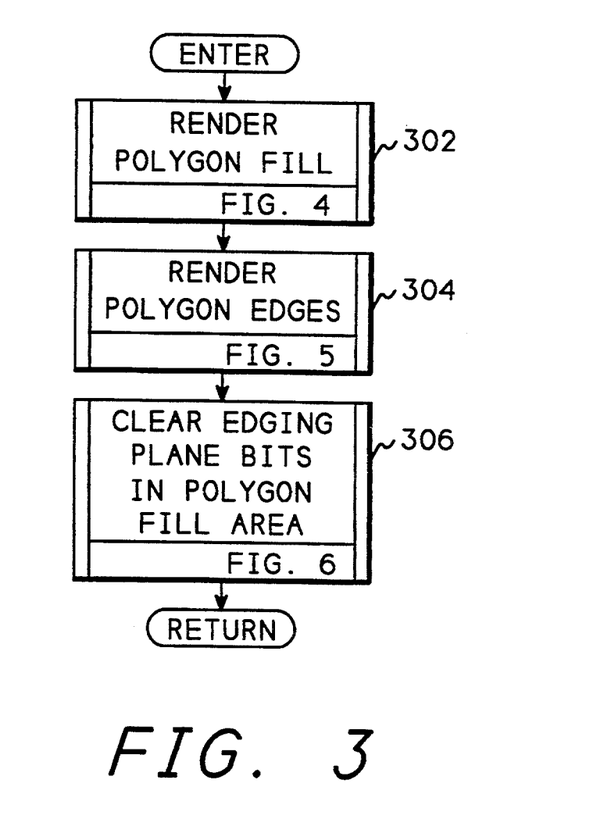
FIG. 3 shows a top level flowchart of the invention.

FIGS. 3–6 show a flowchart of the process of the invention, and FIG. 3 shows a top level of this flowchart. The graphics software 120 (FIG. 1) of the present invention is called from the user software 122 (FIG. 1) when the user software 122 requests a polygon fill with edging.

Figure 4:
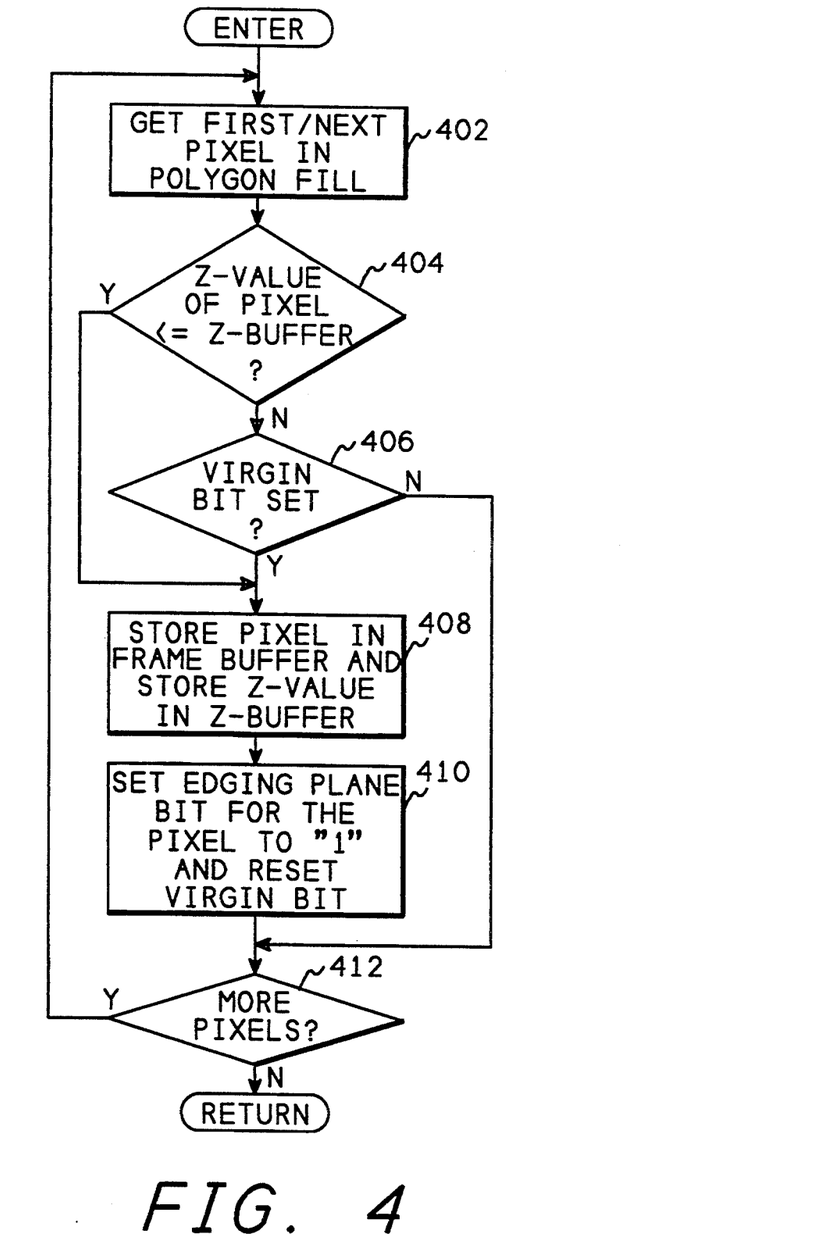
FIG. 4 shows a flowchart of the render polygon fill function called from FIG. 3.

Referring now to FIG. 3, after entry, block 302 calls FIG. 4 to render the polygon fill with z-buffer comparison and z-buffer replace both enabled. During the process described by FIG. 4, an edging plane bit will be set to a value of one for every pixel in the polygon fill which passes the z-compare. As will be discussed below, this edging plane bit can be located in either software or hardware.

Figure 5:
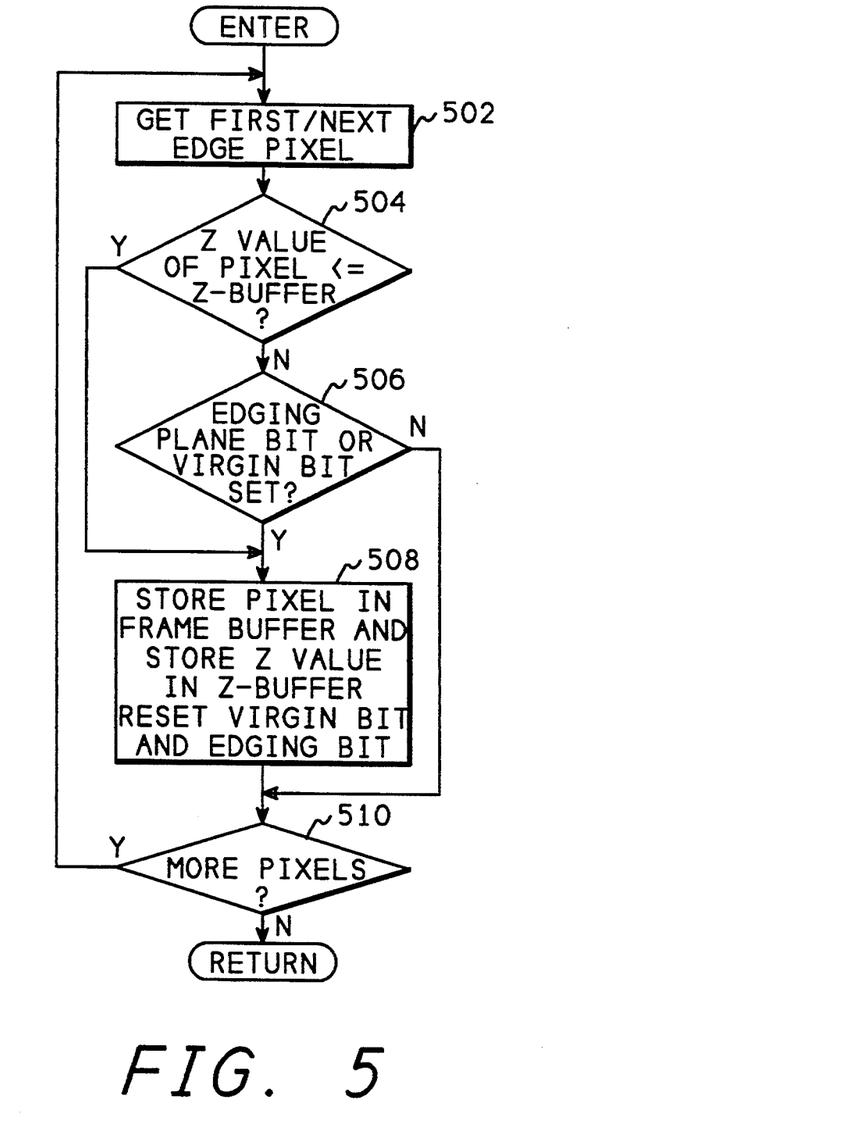
FIG. 5 shows flowchart of the render polygon edges function a called from FIG. 3.

After returning from rendering the polygon fill, block 304 calls the process described by FIG. 5 to render the polygon edges with z-buffer comparison and z-buffer replace enabled. If an underlying pixel has an edging plane value of one, the z-buffer comparison is forced to pass. If the underlying pixel has an edging plane value of zero, normal z-buffer comparison will be performed while rendering the edges.

Figure 6:
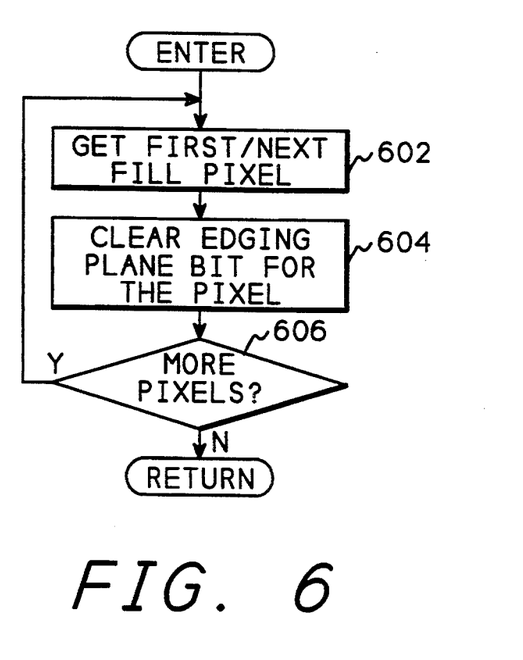
FIG. 6 shows a flowchart of the clear edging plane bits function called from FIG. 3.

After rendering the polygon edges, block 306 calls the process described by FIG. 6 to clear the edging plane bits in the polygon fill area to zero. This does not alter data within the frame buffer, nor the z-buffer, but only sets the edging plane bit values to zero.

FIG. 4 shows a flowchart of the render polygon fill function called from FIG. 3. Referring now to FIG. 4, after entry, block 402 gets the first or next pixel in the polygon fill. This would typically be done by calling a predefined polygon fill subroutine.

Block 404 determines whether the z-value of the pixel obtained in block 402 is less than or equal to the z-buffer value for this location. In this example, lower z values represent positions closer to the viewer's position.

Those skilled in the art will recognize that this could be easily reversed wherein higher z values represent positions closer to the viewer's position, or that any other relation or combination of relations could be considered favorable.

If the z-value for the pixel is greater than the new z-buffer value, block 404 goes to block 406 to test the virgin bit for the z-buffer location. If the virgin bit is not set, block 406 goes to block 412 since this new pixel is further from the viewer's position and should not be displayed.

The virgin bit is a bit that indicates that the location does not currently contain a pixel from another graphics primitive, and therefore the z-buffer value is not valid. The virgin bit is used to improve speed in z-buffer operations, wherein a fast z-buffer clear sets all the virgin bits within an area being cleared. This is faster than clearing the entire z-buffer, since only a small amount of memory needs to be accessed. During rendering, z-buffer comparisons look at the virgin bit for each pixel. If the bit is clear, a normal z-buffer comparison occurs, If the bit is set, the z-buffer value is ignored and z-buffer replace is forced.

If the z-value of the pixel is less than or equal to the value in the z-buffer, or if the virgin bit is set, control transfers to block 408 which stores the pixel in the frame buffer and stores the z-value for the pixel into the z-buffer. Block 410 then sets an edging plane bit for the pixel to a value of one and resets the virgin bit. Control then goes to block 412 which determines whether there are more pixels to be processed and if there are, returns to block 402 to get the next pixel. After all fill pixels have been processed, block 412 returns control to FIG. 3.

FIG. 5 shows a flowchart of the render polygon edges function called from block 304 of FIG. 3. Referring now to FIG. 5, after entry, block 502 gets the first or next edge pixel to be processed. Block 504 determines whether the z-value of the new pixel retrieved in block 502 is less than or equal to the value in the z-buffer at the pixel location. If the new z-value is greater than the contents of the z-buffer, block 504 transfers to block 506 which determines whether the edging plane bit is set or the virgin bit is set for the pixel location. The edging plane bit is set by the method of FIG. 4, and the virgin bit is set by a previous clear of the z-buffer with no subsequent write of another graphics primitive at that location. If either the edging plane bit or the virgin bit is set, or if the z-value was less than or equal to the contents of the z-buffer, control goes to block 508 which stores the new pixel in the frame buffer, stores the z-value of the new pixel into the z-buffer, resets the virgin bit, and resets the edging plane bit.

After performing this store, or if z compare failed and neither the edging plane bit nor the virgin bit was set, control goes to block 510 which determines whether there are more pixels and if there are, returns control to block 502 to get the next pixel. After all pixels have been processed, block 514 returns to FIG. 3.

FIG. 6 shows a flowchart of the clear edging plane bits function called from block 306 of FIG. 3. Referring now to FIG. 6, after entry, block 602 gets the first or next fill pixel and block 604 clears the edging plane bit for the pixel. Block 606 determines if there are more fill pixels to be processed, and if so, returns to block 602 to process the next fill pixel. After all fill pixels have been processed, block 602 returns to FIG. 3.

Implementation of the edging plane method in hardware requires that the z-buffer circuitry be implemented in hardware. The edging plane can be obtained by adding one additional bit to each z-buffer location, or by sacrificing one bit of z-buffer resolution. In many hardware z-buffer implementations, one bit of each location is used as a virgin bit to provide fast z-buffer clears. In the hardware implementation of the preferred embodiment, described below, the edging plane bit shares the virgin bit in the z-buffer, as described below. Thus, the virgin bit is used for two different functions, both as a virgin bit to indicate whether the z-buffer does not contain valid data, and as an edging plane bit during edging operations.

When the preferred embodiment hardware is available to assist, the edging plane method used is still a three step process. In the first step, fill pixels are rendered to the frame buffer and the z-buffer, with z-compares, z-replace, and frame buffer writing enabled, except that after writing a pixel into the frame buffer, the virgin bit in the z-buffer for that pixel is set to one. This is the reverse from the normal operation after writing into a pixel, since normally the virgin bit would be cleared indicating that the z-buffer contains data. The second step of the method renders the edge pixels to the frame buffer and z-buffer, also using z-buffer compares, z-buffer replaces and frame buffer writes. Because, after pass 1, the virgin bit is always set for each polygon fill pixel, the edge pixels will always replace the fill pixels. The third step renders the fill pixels again without z-buffer compare, without z-buffer replace, and without writing to the frame buffer, however, the virgin bit is cleared for each pixel of the polygon fill. After completion of the third step, all virgin bits will be cleared, and all edging plane bits will be cleared.

This method requires two additional hardware operations. The first operation is to set the virgin bit when data is written to the frame buffer and z-buffer at the location for a pixel, which is the reverse of normal operation. The second operation is to perform all the steps necessary to render the fill data, however, the data is not written and instead, the virgin bit is cleared.

When performing pass one, two types of pixels will be encountered in the z-buffer. Pixels having the virgin bit set and pixels having the virgin bit cleared. Fill pixels will win all compares when the virgin bit is set for a location, since this is the function of the virgin bit. Therefore, after pass 1, regardless of the outcome of any of the compares with the pixels having the virgin bit cleared, there will be no pixels left in the fill area having their virgin bit set. So after pass 1, there is no information being stored in the virgin bit of any of the fill pixels for the duration of the rendering of the object. Because of this, the virgin bit can be used as the edging plane bit in the subsequent two steps of the method.

During the second pass, there are still only two types of pixels encountered in the z-buffer, those with the virgin bit cleared, and those with the virgin bit set. For those with the virgin bit cleared, the bit was cleared by another primitive being rendered prior to the current primitive rendering. As a result, the bit is either outside the fill area, or the z-value stored previously for the bit won the z compare against the polygon fill z-value. These pixels compete with the edge pixel z-compare as desired for traditional hidden surface removal. Thus, they will win or lose in the normal functioning of the z-buffer.

For those with the virgin bit set, however, the virgin bit may be set for either of two reasons. Either the pixel is truly a virgin pixel since it is outside the fill area and has not been rendered by another primitive since the last buffer clear, or the pixel is inside the fill area and has the virgin bit set as an edging plane bit. In either case, because the virgin bit is set, the edging pixels will always win, as defined by the standard z-compare method. This is desirable, since the edge pixels are expected to replace either fill pixels or true virgin pixels.

Therefore, after pass two is complete, the frame buffer is correct for all edge or fill pixels, and the z-buffer is correct for all pixels.

The only remaining problem is to clear the virgin bits for all the fill pixels that were not also edge pixels, which is done by clearing all fill pixel virgin bits. This is accomplished in pass 3 which renders the fill pixels again, simply to locate these pixels. As each pixel is rendered, the frame buffer and z-buffer contents are not changed, except that the virgin bit is reset to a value of zero for each of the pixels. Thus, after completion of the third pass, the frame and z-buffer values are correct for both the fill and the edge pixels, and the virgin bits are also correct for both the fill and edge pixels.

Figure 7:
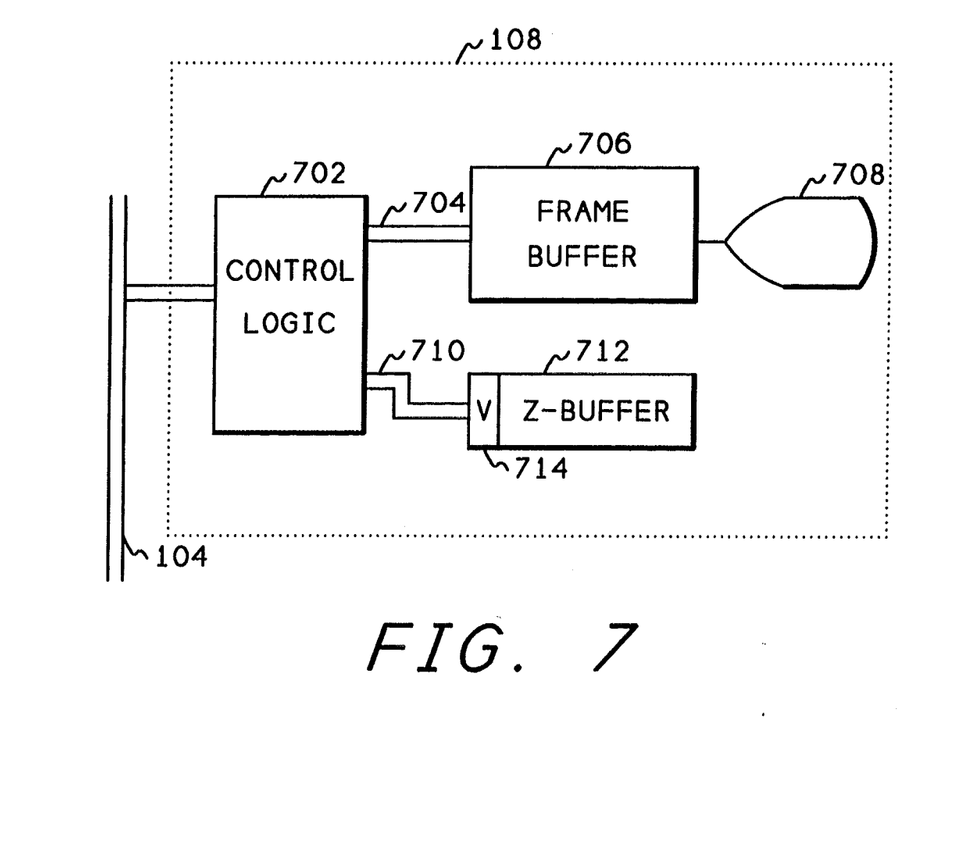
FIG. 7 shows hardware used to implement the invention.

FIG. 7 shows a block diagram of the hardware necessary to implement the edging plane method within the graphics display 108 (FIG. 1). Referring now to FIG. 7, the graphics display 108 is connected to the system bus 104 as described above with respect to FIG. 1. Control logic 702 contains the two additional operations described above, that is, the operation that sets the virgin bit upon z-replace, and the second operation of clearing only the virgin bit upon rendering. In addition to these two operations, control logic 702 implements all the standard operations for the frame and z-buffers. Data is passed from the system bus 104 to the frame buffer 706 over data bus 704 and then on to the display 708. Z-buffer 712 contains the virgin bit 714, and may also contain a separate edging plane bit (not shown). The z-buffer 712 is accessed through a bus 710.

Having thus described a presently preferred embodiment of the present invention, it will now be appreciated that the aspects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A computer implemented method for displaying an object and for displaying edges of said object on a graphics display device, wherein each pixel contained within said object is called a fill pixel, said computer implemented method comprising the steps of:

for each fill pixel of said object, comparing a depth value of said fill pixel to a depth value of a stored pixel at a fill pixel location defined for said fill pixel and testing a virgin bit for said depth value, wherein a virgin bit is a bit connected to each pixel that is set when said each pixel contains invalid data, and when said comparing indicates that said virgin bit is set, or said fill pixel depth value is in a predetermined relationship to said depth value of said stored pixel at said fill pixel location, writing display data, writing depth value data, and setting an edging plane bit for said fill pixel at said fill pixel location;

for each edge pixel of said object, comparing a depth value of said edge pixel to a depth value of a stored pixel at an edge pixel location defined for said edge pixel and testing an edging plane bit and a virgin bit for said edge pixel location, and when said edging plane bit is set, or said virgin bit is set, or said comparing indicates that said edge pixel depth value is in a predetermined relationship to said depth value of said stored pixel at said edge pixel location, writing display data, writing depth value data, resetting said virgin bit, and resetting said edging bit for said edge pixel at said edge pixel location; and for each fill pixel of said object, resetting said edging plane bit at said fill pixel location.

2. The method of claim 1 wherein said edging plane bit and said virgin bit are the same bit.

3. The method of claim 1 wherein said edging plane bit for each of said fill pixels and said edge pixels is part of a data array contained in a memory of a processor attached to said graphics display device.

4. The method of claim 1 wherein said edging plane bit for each of said fill pixels and said edge pixels is part of a z-buffer array contained in said graphics display device.

5. A computer implemented method for displaying an object and for displaying edges of said object on a graphics display device, wherein each pixel contained within said object is called a fill pixel, said computer implemented method comprising the steps of:

for each fill pixel of said object, comparing a depth value of said fill pixel to a depth value of a stored pixel at a fill pixel location defined for said fill pixel and testing a virgin bit in said depth value, wherein a virgin bit is a bit connected to each pixel that is set when said each pixel contains invalid data, and when said comparing indicates that said virgin bit is set, or said fill pixel depth value has a predetermined relationship to said depth value of said stored pixel at said fill pixel location, writing display data, writing depth value data, and setting said virgin bit for said fill pixel at said fill pixel location;

for each edge pixel of said object, comparing a depth value of said edge pixel to a depth value of a stored pixel at an edge pixel location defined for said edge pixel and testing a virgin bit for said edge pixel location, and when said virgin bit is set, or said comparing indicates that said edge pixel depth value has a predetermined relationship to said depth value of said stored pixel at said edge pixel location, writing display data, writing depth value data, and resetting said virgin bit for said edge pixel at said edge pixel location; and for each fill pixel of said object, resetting said virgin bit at said fill pixel location.

6. A computer implemented method for displaying an object and for displaying a decal at least partially covering said object on a graphics display device, wherein each pixel contained within said object is called a fill pixel, said computer implemented method comprising the steps of:

for each fill pixel of said object, comparing a depth value of said fill pixel to a depth value of a stored pixel at a fill pixel location defined for said fill pixel and testing a virgin bit for said depth value, wherein a virgin bit is a bit connected to each pixel that is set when said each pixel contains invalid data, and when said comparing indicates that said virgin bit is set, or said fill pixel depth value is in a predetermined relationship to said depth value of said stored pixel at said fill pixel location, writing display data, writing depth value data, and setting an edging plane bit for said fill pixel at said fill pixel location;

for each decal pixel of said object, comparing a depth value of said decal pixel to a depth value of a stored pixel at a decal pixel location defined for said decal pixel and testing an edging plane bit and a virgin bit for said decal pixel location, and when said edging plane bit is set, or said virgin bit is set, or said comparing indicates that said decal pixel depth value is in a predetermined relationship to said depth value of said stored pixel at said decal pixel location, writing display data, writing depth value data, resetting said virgin bit, and resetting said edging plane bit for said decal pixel at said decal pixel location; and for each fill pixel of said object, resetting said edging plane bit at said fill pixel location.

7. The method of claim 6 wherein said edging plane bit and said virgin bit are the same bit.

8. The method of claim 6 wherein said edging plane bit for each of said fill pixels and said decal pixels is part of a data array contained in a memory of a processor attached to said graphics display device.

9. The method of claim 6 wherein said edging plane bit for each of said fill pixels and said decal pixels is part of a z-buffer array contained in said graphics display device.

10. A computer implemented method for displaying an object and for displaying a decal object at least partially covering said object on a graphics display device, wherein each pixel contained within said object is called a fill pixel, said computer implemented method comprising the steps of:

for each fill pixel of said object, comparing a depth value of said fill pixel to a depth value of a stored pixel at a fill pixel location defined for said fill pixel and testing a virgin bit in said depth value, wherein a virgin bit is a bit connected to each pixel that is set when said each pixel contains invalid data, and when said comparing indicates that said virgin bit is set, or said fill pixel depth value has a predetermined relationship to said depth value of Said stored pixel at said fill pixel location, writing display data, writing depth value data, and setting said virgin bit for said fill pixel at said fill pixel location;

for each decal pixel of said object, comparing a depth value of said decal pixel to a depth value of a stored pixel at a decal pixel location defined for said decal pixel and testing a virgin bit for said decal pixel location, and when said virgin bit is set, or said comparing indicates that said decal pixel depth value has a predetermined relationship to said depth value of said stored pixel at said decal pixel location, writing display data, writing depth value data, and resetting said virgin bit for said decal pixel at said decal pixel location; and for each fill pixel of said object, resetting said virgin bit at said fill pixel location.

* * * * *